US012731981B2

(12) United States Patent
Hirano et al.

(10) Patent No.: US 12,731,981 B2
(45) Date of Patent: Sep. 8, 2026

(54) CONTROL DEVICE AND CONTROL METHOD

(71) Applicant: DENSO CORPORATION, Kariya-city (JP)

(72) Inventors: Takahiro Hirano, Kariya-city (JP); Shigeki Nakamura, Kariya-city (JP)

(73) Assignee: DENSO CORPORATION, Kariya-city (JP)

(*) Notice: Subject to any disclaimer, the term of this patent is extended or adjusted under 35 U.S.C. 154(b) by 150 days.

(21) Appl. No.: 18/461,626

(22) Filed: Sep. 6, 2023

(65) Prior Publication Data

US 2024/0106226 A1 Mar. 28, 2024

(30) Foreign Application Priority Data

Sep. 26, 2022 (JP) ................................ 2022-152721

(51) Int. Cl.
*H02H 5/04* (2006.01)

(52) U.S. Cl.
CPC .................................... *H02H 5/04* (2013.01)

(58) Field of Classification Search
CPC ................................................ H02H 5/04–048
See application file for complete search history.

(56) References Cited

U.S. PATENT DOCUMENTS 8,970,234 B2 * 3/2015 Takayanagi ........... G01K 3/005 324/750.03
2004/0201938 A1 10/2004 Watanabe et al.
2007/0064370 A1 3/2007 Kajiwara
2015/0081177 A1 3/2015 Kawasaki et al.
2015/0346785 A1 * 12/2015 Chen ...................... H04M 1/18 455/575.1
2018/0212415 A1 * 7/2018 Dang ................ G01R 31/2825
2023/0027461 A1 * 1/2023 Harada ................. B60K 6/445

FOREIGN PATENT DOCUMENTS

JP 2017-091075 A 5/2017

OTHER PUBLICATIONS

U.S. Appl. No. 18/461,583, filed Sep. 6, 2023, Hirano.

* cited by examiner

*Primary Examiner* — Thienvu V Tran
*Assistant Examiner* — Christopher J Clark
(74) *Attorney, Agent, or Firm* — Posz Law Group, PLC

(57) ABSTRACT

A control device includes a first circuitry that executes a predetermined process, a temperature sensor that detects a temperature of the first circuitry, and a second circuitry that controls activation and deactivation of the first circuitry based on the temperature detected by the temperature sensor. The second circuitry has a first threshold and a second threshold larger than the first threshold as thresholds related to the temperature detected by the temperature sensor. The second circuitry activates the first circuitry on condition that a temperature detection value that is a value of the temperature detected by the temperature sensor does not exceed the first threshold. The second circuitry deactivates the first circuitry after activation of the first circuitry on condition that the temperature detection value exceeds the second threshold.

12 Claims, 6 Drawing Sheets

11
SENSOR
13
SENSOR
15
ECU
17
ECU
19
COMMUNICATION LINE
1
ECU
3
MICROCONTROLLER
7
TRANSCEIVER
STB
SUPPLY VOLTAGE (FOR CORE)
SUPPLY VOLTAGE (FOR IO)
RST
EOUT
WD
5
POWER SUPPLY IC
8
TEMP. SENSOR

ECU
10
POWER SUPPLY IC
5
SUPPLY VOLTAGE (FOR CORE)
SUPPLY VOLTAGE (FOR IO)
RST
EOUT
WD
TEMP. SENSOR
9
MICROCONTROLLER
3
SENSOR
11
SENSOR
13
ECU
15
ECU
17
STB
TRANSCEIVER
7
19
COMMUNICATION LINE

CONTROL DEVICE AND CONTROL METHOD

CROSS REFERENCE TO RELATED APPLICATION

This application is based on and incorporates herein by reference Japanese Patent Application No. 2022-152721 filed on Sep. 26, 2022.

TECHNICAL FIELD

The present disclosure relates to a control device and a control method.

BACKGROUND

An IC of a switching power supply has a first threshold and a second threshold as thresholds related to a temperature, and executes fail-safe controls having different contents when a monitoring target temperature reaches the first threshold and when the monitoring target temperature reaches the second threshold.

SUMMARY

According to at least one embodiment, a control device includes a first circuitry, a temperature sensor, and a second circuitry.

BRIEF DESCRIPTION OF THE DRAWINGS

The details of one or more embodiments are set forth in the accompanying drawings and the description below. Other features and advantages will be apparent from the description and drawings, and from the claims.

DETAILED DESCRIPTION

Figure 1:
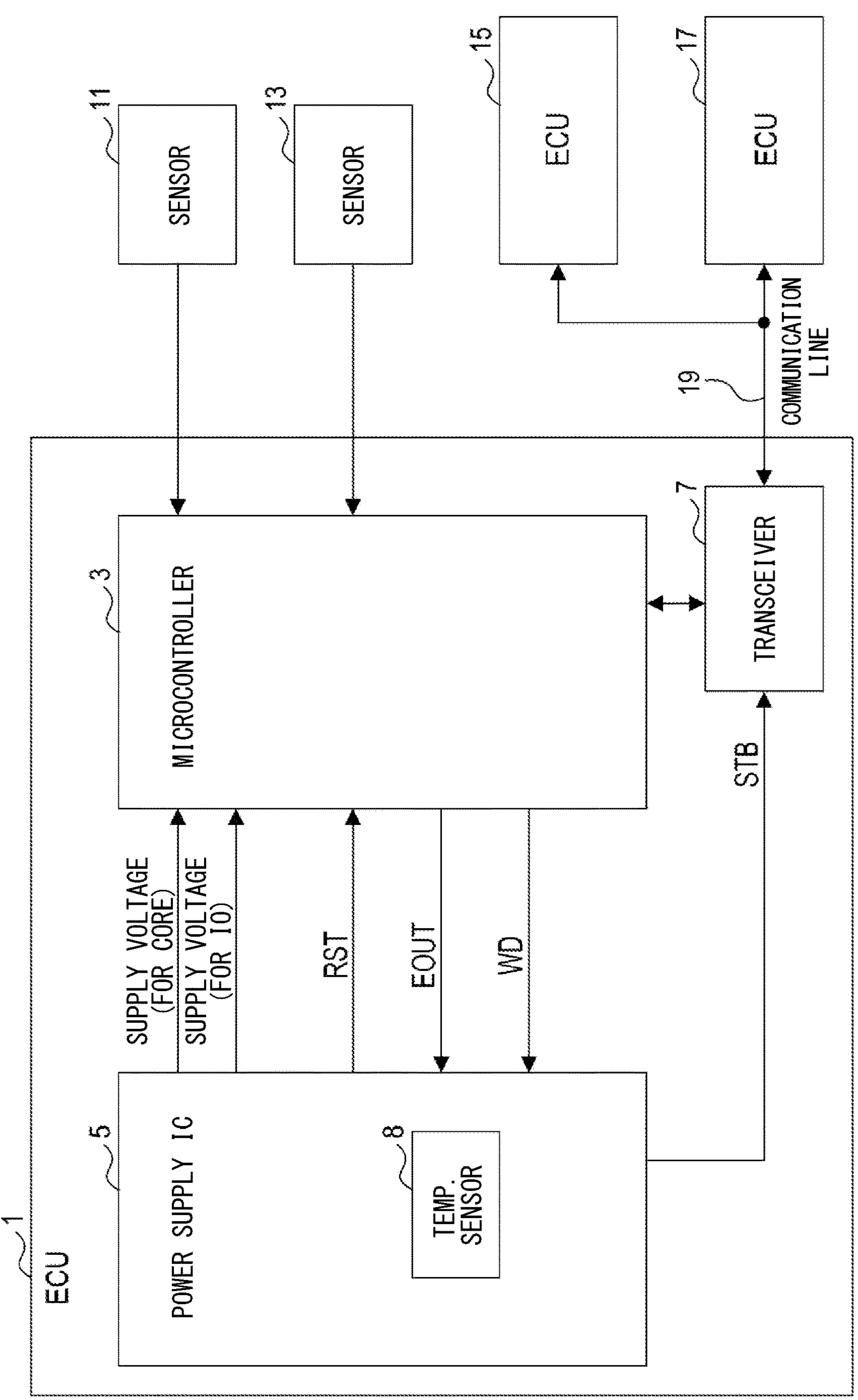
FIG. 1 is a block diagram illustrating a configuration of an ECU according to a first embodiment.

A comparative example will be described. An IC of a switching power supply has a first threshold and a second threshold as thresholds related to a temperature, and executes fail-safe controls having different contents when a monitoring target temperature reaches the first threshold and when the monitoring target temperature reaches the second threshold.

As a result of the inventors' detailed studies, the following issues have been found in the comparative example. In a control device, a temperature of a controller such as a microcontroller is detected by a temperature sensor. The controller is deactivated when a temperature detection value, which is a value of the detected temperature, exceeds a threshold for preventing overheating. The controller is activated when the temperature detection value falls below the threshold.

In this case, once the temperature detection value exceeds the threshold, the following state changes are repeated in a relatively short time: deactivation of the controller→the temperature detection value becomes lower than or equal to the threshold→activation of the controller→the temperature detection value becomes higher than the threshold→deactivation of the controller→the temperature detection value becomes lower than or equal to the threshold→activation of the controller.

Then, cumulative time during which an actual temperature inside the controller exceeds the threshold becomes longer, and the actual temperature inside the controller may continue to exceed the threshold. For example, a characteristic of a heat conduction path between a heat generation portion and the temperature sensor in the controller or a delay in detection of temperature may cause a deviation between the actual temperature inside the controller and the temperature detection value. Therefore, after the controller is deactivated, there is a possibility that the temperature detection value becomes equal to or less than the threshold and the controller is activated while the actual temperature inside the controller remains higher than the threshold.

Therefore, the controller may be activated in an overheated state, and the operation of the controller becomes unstable. As a result, the overheated state may cause an unstable operation of the control device. Although the threshold can be set at a sufficiently small value, a temperature margin becomes excessive with respect to the operation of the controller, and it may be difficult to effectively utilize the resources of the controller.

In contrast, according to an aspect of the present disclosure, a control device and a control method are capable of reducing an operation of a controller in an overheated state.

A control device according to an aspect of the present disclosure includes a controller configured to execute a predetermined process, a temperature sensor configured to detect a temperature of the controller, and a monitoring unit configured to control activation and deactivation of the controller based on the temperature detected by the temperature sensor.

The monitoring unit has a first threshold and a second threshold larger than the first threshold as thresholds related to the temperature of the controller detected by the temperature sensor. The monitoring unit activates the controller on the condition that a temperature detection value, which is a value of the temperature detected by the temperature sensor, does not exceed the first threshold, and deactivates the controller after activation of the controller on the condition that the temperature detection value exceeds the second threshold.

According to the configuration, the second threshold for deactivating of the controller is different from the first threshold for activating the controller, and the first threshold is set to a smaller value than the second threshold. Therefore, even if there is a deviation between the actual temperature inside the controller and the temperature detection value, the controller can be activated in a state where the actual temperature inside the controller is sufficiently lower than the second threshold. Therefore, the controller can be prevented from being activated in an overheated state, that is, the controller can be prevented from operating in the overheated state. As a result, an unstable operation of the controller can be reduced, and thus an unstable operation of the control device can be reduced. In addition, since the second threshold does not have to be set to a value smaller than necessary, it is easy to avoid a temperature margin excessive with respect to the operation of the controller.

The expression "does not exceed the first threshold" is not limited to "being equal to or less than the first threshold", and may not be strictly "being equal to or less than the first threshold" as long as the same effect as described above is obtained. For example, "being less than the first threshold" may be used, alternatively. Similarly, "exceeding the second threshold" is not limited to "being greater than the second threshold", and may not be strictly "being greater than the second threshold" as long as the same effect as described above is obtained. For example, "being equal to or greater than the second threshold" may be used alternatively.

Hereinafter, embodiments of the present disclosure will be described with reference to the drawings.

First Embodiment

An ECU 1 of a first embodiment shown in FIG. 1 is mounted on a vehicle, and includes a microcontroller (microcomputer) 3 that controls an operation of the ECU 1, a power supply IC 5 that supplies power to the microcontroller 3 and monitors an operation of the microcontroller 3, and a transceiver 7. Note that "power supply" means supply of a power supply voltage. The ECU is an abbreviation for "Electronic Control Unit". The microcontroller 3 may be a so-called SoC. SoC is an abbreviation for "System on a Chip". The microcontroller 3 is an example of a first circuitry configured to execute a predetermined process, and the power supply IC 5 is an example of a second circuitry configured to control activation and deactivation of the first circuitry.

Information from one or more sensors 11, 13 mounted on the vehicle is input to the ECU 1. The sensors 11, 13 may be sensors for detecting information related to the vehicle, and may be, for example, peripheral monitoring sensor devices such as a camera or a millimeter wave radar for detecting information around the vehicle. The ECU 1 is communicably connected to other ECUs 15, 17 via a communication line 19. The ECUs 15, 17 are mounted on the vehicle.

The microcontroller 3 has at least functions of receiving input information from the sensors 11, 13, integrating or dividing the input information, and transmitting the information to the other ECUs 15, 17. Therefore, the microcontroller 3 executes a process for communicating with at least the other ECUs 15, 17 as a predetermined process for controlling the operation of the ECU 1. Further, the microcontroller 3 may have a function of transmitting update data of control contents to the other ECUs 15, 17.

The microcontroller 3 is connected to the communication line 19 via the transceiver 7. The transceiver 7 converts a transmission signal (i.e., a signal of transmission data) output from the microcontroller 3 into a transmission signal conforming to a communication protocol, and outputs the transmission signal to the communication line 19. Further, the transceiver 7 converts a transmission signal from the communication line 19 into a reception signal (i.e., a signal of reception data) that can be input to the microcontroller 3 based on the communication protocol, and outputs the reception signal to the microcontroller 3. Therefore, the microcontroller 3 can communicate with the other ECUs 15, 17 via the transceiver 7. The communication protocol is, for example, CAN, but may be other than CAN. CAN is an abbreviation for "Controller Area Network". CAN is a registered trademark.

For example, the ECU 15 may be configured to execute control for providing information, such as the surroundings of the vehicle and an alarm, to a driver of the vehicle on the basis of information transmitted from the microcontroller 3. For example, the ECU 17 may be configured to control power, braking, steering, and the like of the vehicle based on information transmitted from the microcontroller 3.

Further, the transceiver 7 is configured to be stopped when a standby signal STB input from the power supply IC 5 becomes an active level (e.g., high level). Therefore, when the standby signal STB becomes at the high level, the transceiver 7 stops at least an output of the signal to the communication line 19 (i.e., communication output) regardless of the transmission signal from the microcontroller 3.

The microcontroller 3 outputs a watchdog signal WD indicating a normal operation of the microcontroller 3 to the power supply IC 5 according to a predetermined output rule. The output rule of the watchdog signal WD may be, for example, a rule that the level of the watchdog signal WD is inverted every predetermined time. In addition, the watchdog signal WD may be a data signal transmitted via serial communication such as SPI, and the output rule in this case may be, for example, a rule in which the data value is updated by a predetermined rule every predetermined time. SPI is abbreviation for "Serial Peripheral Interface".

The microcontroller 3 periodically executes the self-diagnosis during the operation of the microcontroller 3. The term "periodically" used herein is not limited to fixed time intervals, and may be time intervals different for each time.

The self-diagnosis of the microcontroller 3 may include, for example, a voltage diagnosis. In the voltage diagnosis, for example, a circuit block provided in the microcontroller 3 for voltage diagnosis monitors a power supply voltage inside the microcontroller 3. When the power supply voltage is out of a normal range, the voltage may be determined to be abnormal.

The self-diagnosis of the microcontroller 3 may include, for example, a calculation diagnosis. In the calculation diagnosis, for example, diagnosis software gives a dummy input value to each predetermined calculation process executed by the microcontroller 3. When a calculation result is different from a predetermined expected value, a calculation function may be determined to be abnormal.

When an abnormality is detected in the self-diagnosis, that is, when it is determined that the voltage is determined to be abnormal or the calculation function is determined to be abnormal, the microcontroller 3 sets an abnormality notification signal EOUT to the power supply IC 5 at an active level (e.g., low level). That is, the low level of the abnormality notification signal EOUT is a signal for notifying the power supply IC 5 that an abnormality has been detected by the self-diagnosis of the microcontroller 3.

The power supply IC 5 generates at least one power supply voltage for operating the microcontroller 3 from a voltage (i.e., battery voltage) of an in-vehicle battery, and supplies the power supply voltage to the microcontroller 3. One power supply voltage or multiple power supply voltages may be supplied from the power supply IC 5 to the microcontroller 3. The multiple power supply voltages may include, for example, a power supply voltage for a processor core in the microcontroller 3 and a power supply voltage for IO (i.e., input/output circuit) in the microcontroller 3. When the multiple power supply voltages are supplied to the microcontroller 3, the above-described voltage diagnosis may be executed for each power supply voltage.

The power supply IC 5 monitors the operation of the microcontroller 3, and resets the microcontroller 3 when a predetermined reset condition is satisfied. Specifically, the power supply IC 5 resets the microcontroller 3 by setting a reset signal RST to the microcontroller 3 at low in active level for a predetermined time. The reset condition is a condition in which the power supply IC 5 determines that the microcontroller 3 is abnormal. The power supply IC 5 may be configured to determine that the reset condition is satisfied, for example, when the abnormality notification signal EOUT from the microcontroller 3 changes from the high level to the low level, or when the watchdog signal WD from the microcontroller 3 is not output according to the predetermined output rule.

The power supply IC 5 further includes a temperature sensor 8. The temperature sensor 8 is built in the power supply IC 5. The power supply IC 5 is provided relatively close to (i.e., in proximity to) the microcontroller 3 so that a temperature detected by the temperature sensor 8 and a temperature of the microcontroller 3 are correlated with each other. Therefore, the temperature sensor 8 is used in the power supply IC 5 to detect at least the temperature of the microcontroller 3. The temperature sensor 8 may have, for example, a configuration using a characteristic that a forward drop voltage of a diode varies depending on the temperature, or may have another configuration.

The power supply IC 5 controls at least supply and stop of the power supply voltage to the microcontroller 3 based on the temperature of the microcontroller 3 detected by the temperature sensor 8. As a result, the power supply IC 5 controls activation and deactivation of the microcontroller 3.

Further, the power supply IC 5 has a first threshold Th1 and a second threshold Th2 as thresholds related to the temperature of the microcontroller 3 detected by the temperature sensor 8. The first and second thresholds may be stored in a memory.

Figure 2:
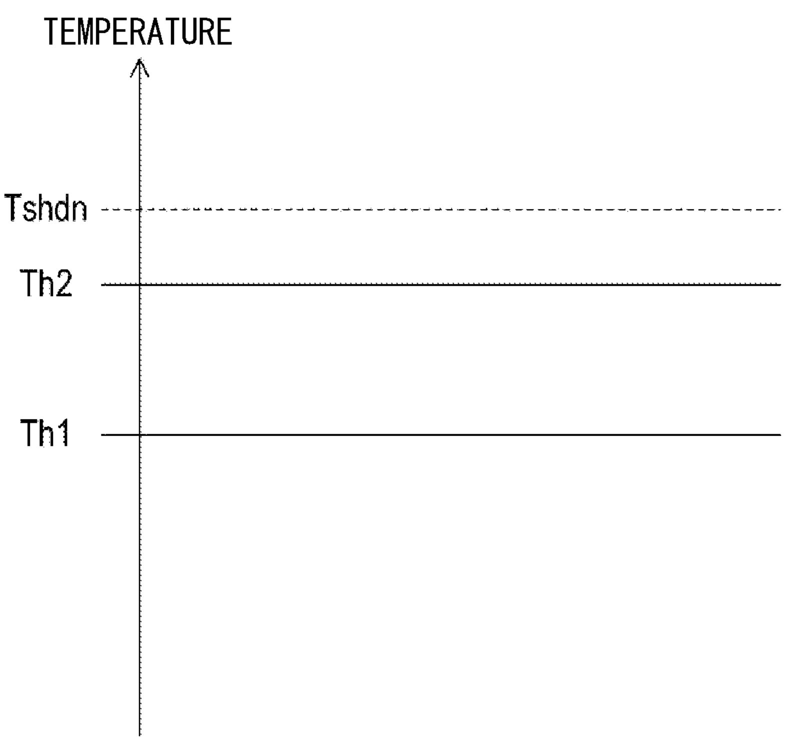
FIG. 2 is a diagram illustrating a threshold related to temperature.

As illustrated in FIG. 2, the second threshold Th2 is set to a value larger than the first threshold Th1. In other words, the first threshold Th1 is set to a value smaller than the second threshold Th2. The second threshold Th2 is set to a value smaller than a maximum rated temperature Tshdn of the power supply IC 5. Further, although not shown in FIG. 2, the second threshold Th2 is set to a value slightly smaller than a maximum rated temperature of the microcontroller 3. For example, the second threshold Th2 may be set to 145° C., and the first threshold Th1 may be set to 120° C.

Here, an operation of the power supply IC 5 will be described based on the flowchart of FIG. 3, but the operation of the power supply IC 5 is actually realized by hardware inside the power supply IC 5.

For example, when a battery voltage is supplied to the ECU 1, the power supply IC 5 is supplied with power from a power supply circuit and is activated. When activated, the power supply IC 5 executes the process shown in FIG. 3.

Figure 3:
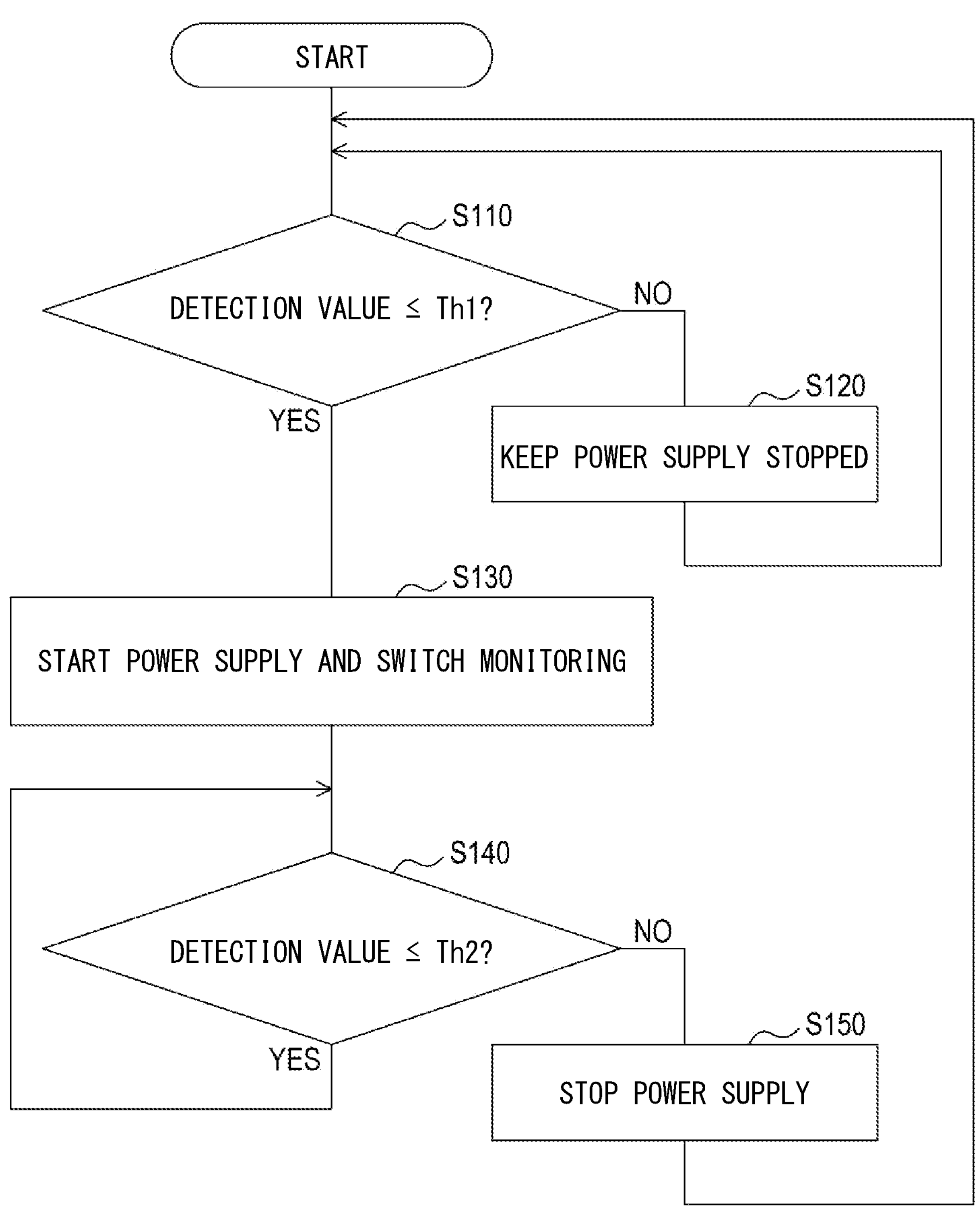
FIG. 3 is a flowchart illustrating an operation of a power supply IC.

As shown in FIG. 3, in step S110, the power supply IC 5 executes pre-activation temperature monitoring, which is temperature monitoring before activation of the microcontroller 3. In the pre-activation temperature monitoring, the power supply IC 5 monitors whether a temperature detection value, which is a value of the temperature detected by the temperature sensor 8, is equal to or less than the first threshold Th1.

When the power supply IC 5 determines that the temperature detection value is higher than the first threshold Th1 by the pre-activation temperature monitoring, the power supply IC 5 keeps the supply of the power supply voltage to the microcontroller 3 stopped and does not activate the microcontroller 3 in step S120. Then, the power supply IC 5 continues the pre-activation temperature monitoring. While the supply of the power supply voltage to the microcontroller 3 is stopped, the power supply IC 5 sets the reset signal RST to the microcontroller 3 to the low level to reset the microcontroller 3, and sets the standby signal STB to the transceiver 7 to the high level to prohibit output from the transceiver 7.

On the other hand, when the power supply IC 5 determines that the temperature detection value is equal to or less than the first threshold Th1 by the pre-activation temperature monitoring, that is, when the power supply IC 5 determines that the temperature detection value does not exceed the first threshold Th1, the process proceeds to step S130. Then, in step S130, the microcontroller 3 is activated, and the temperature monitoring is switched to operation temperature monitoring, which is temperature monitoring during the operation of the microcontroller 3.

In step S130, the power supply IC 5 starts the supply of the power supply voltage to the microcontroller 3 and activates the microcontroller 3 by switching the reset signal RST from the low level to the high level. The switching of the reset signal RST to the high level (i.e., release of reset) may be executed slightly later than the start of the supply of the power supply voltage, for so-called power-on reset. When a predetermined condition for permitting communication output is satisfied after the reset signal RST is switched to the high level, the power supply IC 5 switches the standby signal STB to the transceiver 7 from the high level to the low level to permit the communication output.

After activation of the microcontroller 3, the power supply IC 5 executes the operation temperature monitoring in step S140. In the operation temperature monitoring, the power supply IC 5 monitors whether the temperature detection value is equal to or less than the second threshold Th2. While the power supply IC 5 determines that the temperature detection value is equal to or less than the second threshold Th2 by the operation temperature monitoring, the power supply IC 5 continues the operation temperature monitoring.

On the other hand, when the power supply IC 5 determines that the temperature detection value is higher than the second threshold Th2 by the operation temperature monitoring, that is, when the power supply IC 5 determines that the temperature detection value exceeds the second threshold Th2, the power supply IC 5 stops the supply of the power supply voltage to the microcontroller 3 to stop the operation of the microcontroller 3 in step S150. After that, the process returns to step S110 to execute the pre-activation temperature monitoring.

An example of the above-described operation executed by the power supply IC 5 will be described with reference to the time chart of FIG. 4.

Figure 4:
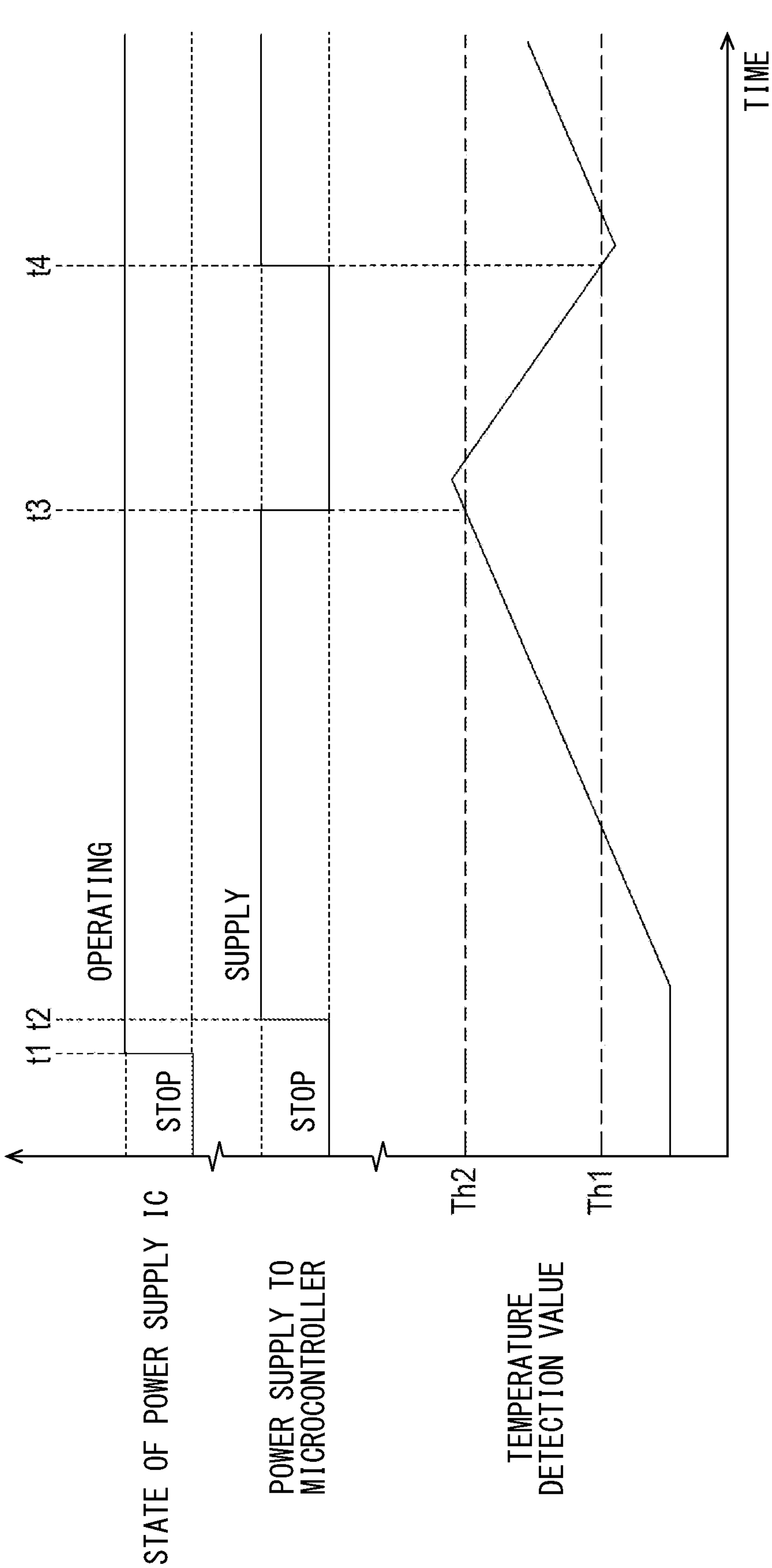
FIG. 4 is a time chart illustrating an operation example of the embodiment.

As shown in FIG. 4, the power supply IC 5 is assumed to be activated at time t1. When the power supply IC 5 is activated, the microcontroller 3 is not activated.

When the activated power supply IC 5 determines that the temperature detection value of the microcontroller 3 detected by the temperature sensor 8 is equal to or less than the first threshold Th1, the power supply IC 5 activates the microcontroller 3 by starting the supply of the power supply voltage to the microcontroller 3 at time t2.

Thereafter, when the temperature of the microcontroller 3 rises with the operation of the microcontroller 3 and the temperature detection value of the microcontroller 3 detected by the temperature sensor 8 exceeds the second threshold Th2 at time t3, the power supply IC 5 stops the supply of the power supply voltage to the microcontroller 3 and stops the operation of the microcontroller 3.

Then, the temperature of the microcontroller 3 decreases. Then, at time t4, when the temperature detection value of the microcontroller 3 detected by the temperature sensor 8 becomes equal to or less than the first threshold Th1, the power supply IC 5 restarts the supply of the power supply voltage to the microcontroller 3 and activates the microcontroller 3.

Figure 5:
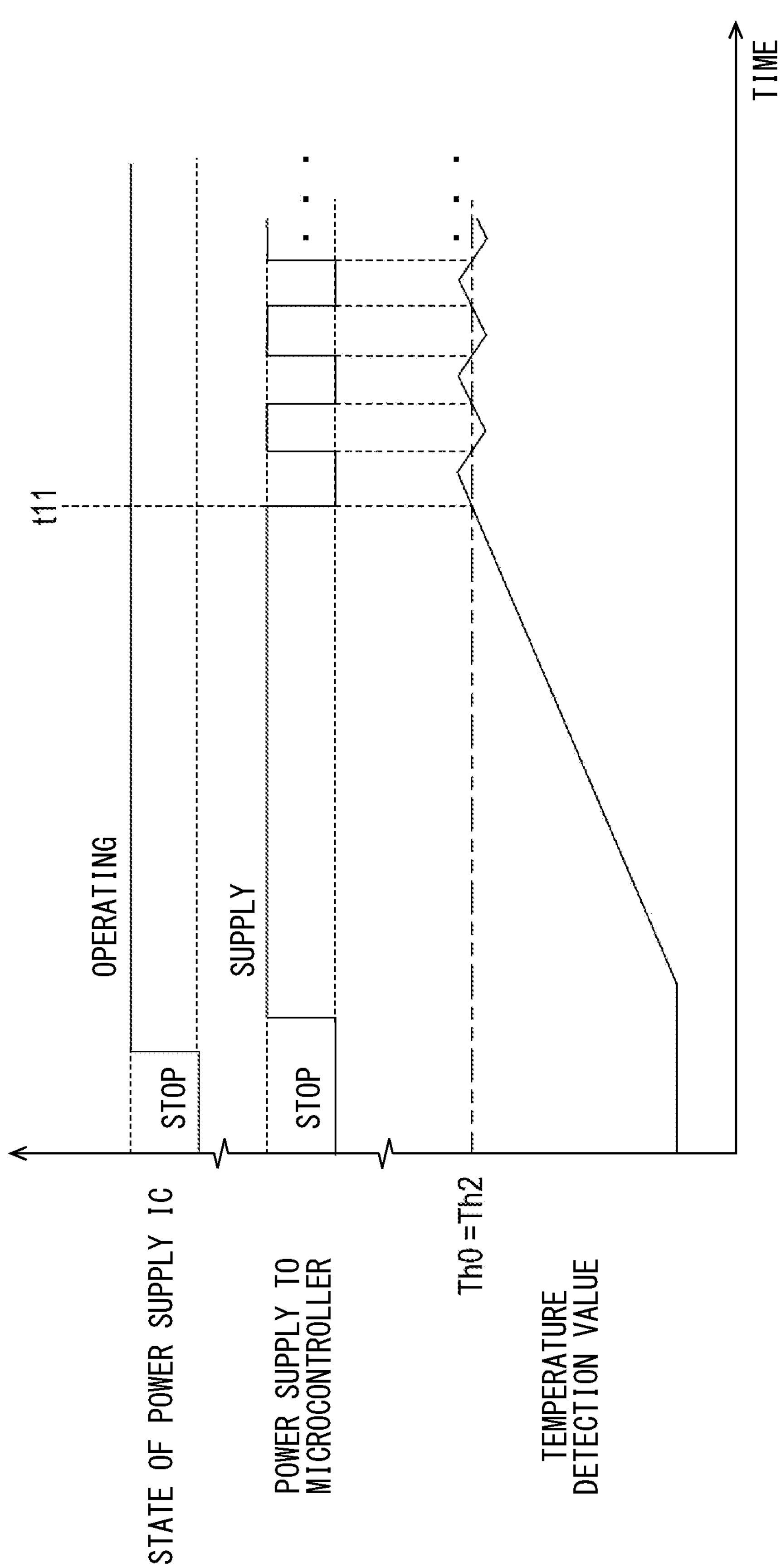
FIG. 5 is a time chart illustrating a comparative example.

A comparative example will be described with reference to FIG. 5. The comparative example is a case where the second threshold Th2 is also used in the pre-activation temperature monitoring in step S110 of FIG. 3, that is, a case where one threshold Th0 having the same value as the second threshold Th2 is used before the activation and during the operation of the microcontroller 3.

In this comparative example, after time t11, once the temperature detection value exceeds the threshold Th0, the following state changes are repeated in a relatively short time: deactivation of the microcontroller 3→the temperature detection value becomes lower than or equal to the threshold Th0→activation of the microcontroller 3→the temperature detection value becomes higher than the threshold Th0→deactivation of the microcontroller 3→ . . . . Then, cumulative time during which an actual temperature inside the microcontroller 3 exceeds the threshold Th0 becomes longer, and the actual temperature inside the microcontroller 3 may continue to exceed the threshold Th0. For example, a characteristic of a heat conduction path between a heat generation portion and the temperature sensor 8 in the microcontroller 3 or a delay in detection of temperature may cause a deviation between the actual temperature inside the microcontroller 3 and the temperature detection value. Therefore, after the microcontroller 3 is deactivated, there is a possibility that the temperature detection value becomes equal to or less than the threshold Th0 and the microcontroller 3 is activated while the actual temperature inside the microcontroller 3 remains higher than the threshold Th0.

Thus, the microcontroller 3 is activated in a state in which the maximum rated temperature of the microcontroller 3 is exceeded (i.e., an overheated state). Then, the operation of the microcontroller 3 may become unstable, and the operation of the ECU 1 may become unstable. For example, after the microcontroller 3 is started in the overheated state, the standby signal STB to the transceiver 7 may be set to the low level. In this case, an indefinite communication signal may be transmitted to the other ECUs 15 and 17.

Although the threshold Th0 can be set at a sufficiently small value (e.g., the same value as the first threshold), a temperature margin becomes excessive with respect to the operation of the microcontroller 3, and it may be difficult to effectively utilize the resources of the microcontroller 3.

In the present embodiment, the microcontroller 3 corresponds to a controller in the present disclosure, and the power supply IC 5 corresponds to a monitoring unit in the present disclosure.

The ECU 1 of the present embodiment can solve the difficulties that may occur in the comparative example.

(1a) In the ECU 1, the power supply IC 5 has a first threshold Th1 and a second threshold Th2 larger than the first threshold Th1 as thresholds related to the temperature detection value of the microcontroller 3 detected by the temperature sensor 8. The power supply IC 5 activates the microcontroller 3 on the condition that the temperature detection value does not exceed the first threshold Th1, and deactivates the microcontroller 3 after activation of the microcontroller 3 on the condition that the temperature detection value exceeds the second threshold Th2. That is, the second threshold Th2 for deactivating of the microcontroller 3 is different from the first threshold Th1 for activating the microcontroller 3, and the first threshold Th1 is set to a smaller value than the second threshold Th2.

Therefore, even if there is a deviation between the actual temperature inside the microcontroller 3 and the temperature detection value, the microcontroller 3 can be started in a state where the actual temperature inside the microcontroller 3 is sufficiently lower than the second threshold Th2. Therefore, the microcontroller 3 can be prevented from being activated in the overheated state, that is, the microcontroller 3 can be prevented from operating in the overheated state. As a result, the unstable operation of the microcontroller 3 can be reduced, and thus the unstable operation of the ECU 1 can be reduced. In addition, since the second threshold Th2 does not have to be set to a value smaller than necessary, it is easy to avoid a temperature margin excessive with respect to the operation of the microcontroller 3.

(1b) The power supply IC 5 can also control the activation and the deactivation of the microcontroller 3 only by the reset signal RST while keeping the power supply. On the other hand, in the ECU 1 of the above embodiment, the power supply IC 5 activates the microcontroller 3 by supplying the power supply voltage to at least the microcontroller 3, and deactivates the microcontroller 3 by stopping the supply of the power supply voltage to at least the microcontroller 3. According to this configuration, since the operation of the microcontroller 3 is stopped by stopping the supply of the power supply voltage to the microcontroller 3, the temperature rise of the microcontroller 3 can be easily reduced.

(1c) Since the temperature sensor 8 is built in the power supply IC 5, the ECU 1 can be downsized. Further, in a case where the temperature sensor 8 monitors also the temperature of the power supply IC 5, the temperature sensor 8 can be easily shared between the temperature monitoring of the microcontroller 3 and the temperature monitoring of the power supply IC 5.

Second Embodiment

Since the basic configuration of a second embodiment is similar to the first embodiment, the difference will be described below. The same reference signs as in the first embodiment indicate the same structural components, and the description of the first embodiment regarding the same reference signs are incorporated by reference.

Figure 6:
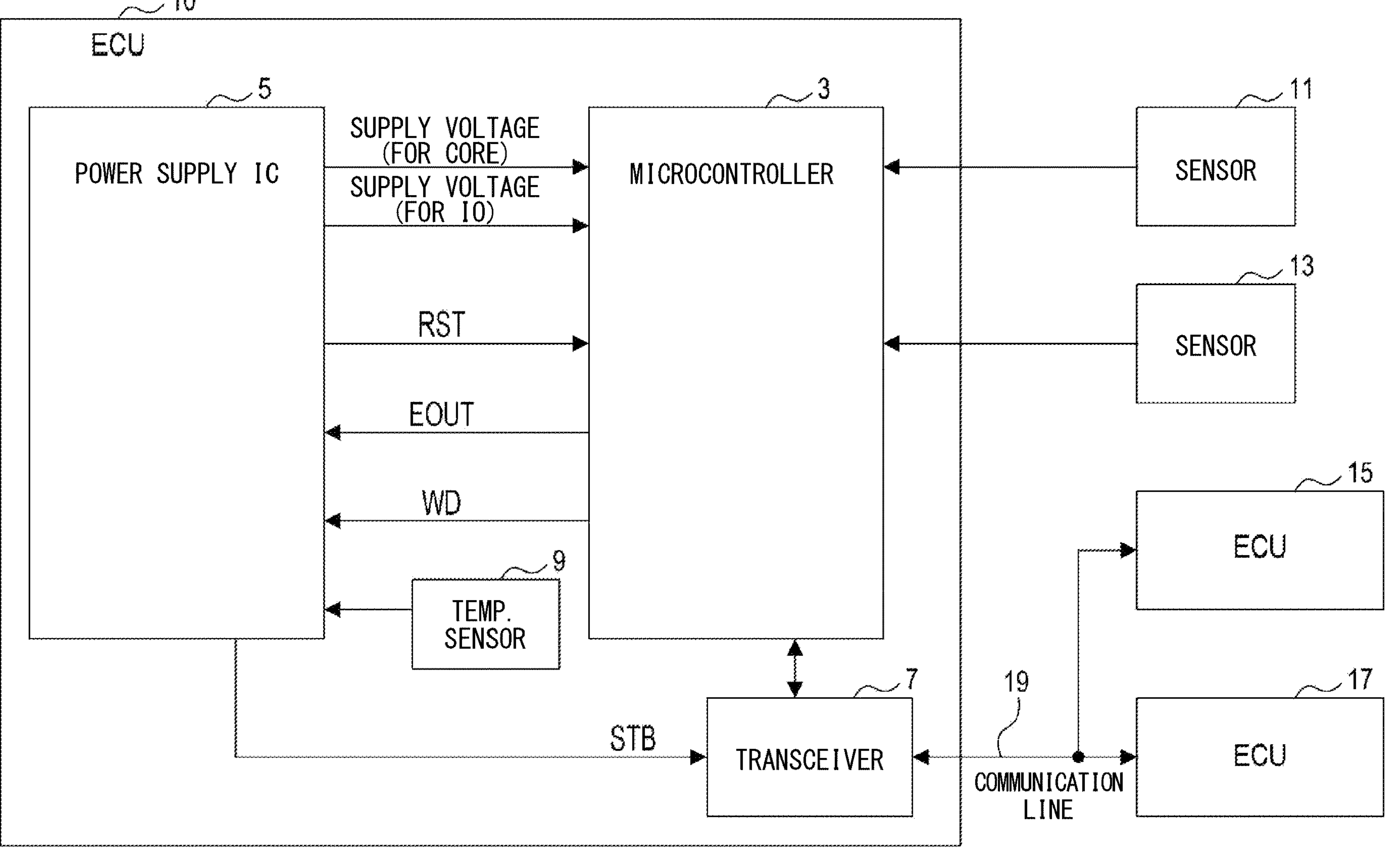
FIG. 6 is a block diagram illustrating a configuration of an ECU according to a second embodiment.

In a ECU 10 of the second embodiment shown in FIG. 6, a temperature sensor 9 for detecting a temperature of a microcontroller 3 is provided outside both the microcontroller 3 and a power supply IC 5.

According to the second embodiment, similarly to the first embodiment, the effects of (1a) and (1b) described above are achieved.

Further, the temperature sensor for detecting the temperature of the microcontroller 3 may employ, for example, a temperature sensor built in the microcontroller 3. However, the reliability of the temperature detection value when the microcontroller 3 is overheated may be low. On the other hand, in the ECU 10 of the second embodiment, since the temperature sensor 9 is provided outside the microcontroller 3, reliability regarding temperature monitoring of the microcontroller 3 is high.

Although the embodiment of the present disclosure has been described above, the present disclosure is not limited to the embodiment described above, and various modifications can be made to implement the present disclosure.

For example, in the pre-activation temperature monitoring in step S110 of FIG. 3, the power supply IC 5 may determine whether the temperature detection value is less than the first threshold Th1. That is, when the temperature detection value is less than the first threshold Th1, it may be determined that the temperature detection value does not exceed the first threshold Th1, and the activation of the microcontroller 3 may be executed. Such a configuration is also substantially the same as the above-described embodiment.

In the operation temperature monitoring in step S140 of FIG. 3, the power supply IC 5 may determine whether the temperature detection value is less than the second threshold Th2. That is, when the temperature detection value is equal to or greater than the second threshold Th2, it may be determined that the temperature detection value exceeds the second threshold Th2, and the deactivation of the microcontroller 3 may be executed. Such a configuration is also substantially the same as the above-described embodiment.

A microcontroller that executes the same function as the power supply IC 5 may be realized by a microcontroller different from the microcontroller 3.

The ECU 1, 10 and the methods described in the present disclosure may be implemented by a dedicated computer provided by configuring a processor and memory programmed to perform one or more functions embodied by a computer program. Alternatively, the ECU 1, 10 and the method described in the present disclosure may be implemented by a dedicated computer provided by configuring a processor with one or more dedicated hardware logic circuits. Alternatively, the ECU 1, 10 and the method described in the present disclosure may be implemented by one or more dedicated computers configured by combinations of processors and memories programmed to perform one or more functions and processors configured by one or more hardware logic circuits. The computer program may also be stored on a computer readable non-transitory tangible recording medium as instructions to be executed by a computer. The method for realizing the functions of the respective units included in the ECU 1, 10 does not necessarily need to include software, and all of the functions may be realized by use of one or more hardware.

A plurality of functions of one element in the above embodiment may be implemented by a plurality of elements, or one function of one element may be implemented by a plurality of elements. In addition, multiple functions of multiple components may be realized by one component, or a function realized by the multiple components may be realized by one component. In addition, a part of the configuration of the above embodiment may be omitted.

The present disclosure may be implemented, in addition to the ECU 1, 10 described above, various forms such as a system including the ECU 1, 10 as a component, a program for causing a computer to function as the ECU 1, 10, a non-transitory tangible storage medium including a semiconductor memory storing the program, a method for activating and deactivating a controller in the control device.

While the present disclosure has been described with reference to various exemplary embodiments thereof, it is to be understood that the disclosure is not limited to the disclosed embodiments and constructions. To the contrary, the disclosure is intended to cover various modifications and equivalent arrangements. In addition, while the various elements of the disclosure are shown in various combinations and configurations, which are exemplary, other various combinations and configurations, including more, less or only a single element, are also within the spirit of the disclosure.

What is claimed is:

1. A control device that includes a first circuitry including a processor configured to execute a predetermined control process for controlling an operation of the control device;

a temperature sensor configured to detect at least a temperature of the first circuitry; and a second circuitry configured to control activation and deactivation of the first circuitry based on the temperature detected by the temperature sensor, wherein the entire temperature sensor is built in the second circuitry, the second circuitry is further configured to have a first threshold and a second threshold larger than the first threshold as thresholds related to the temperature detected by the temperature sensor, activate the first circuitry on a condition that a temperature detection value that is a value of the temperature detected by the temperature sensor is less than or equal to the first threshold, deactivate the first circuitry after activation of the first circuitry on a condition that the temperature detection value is larger than the second threshold, activate the first circuitry by supplying at least a power supply voltage to the first circuitry, and deactivate the first circuitry by stopping the supply of at least the power supply voltage to the first circuitry, when the second circuitry determines that the temperature detection value is larger than the second threshold, the second circuitry is configured to stop the supply of the power supply voltage to the first circuitry, continue to monitor the temperature of the first circuitry using the temperature sensor built in the second circuitry while the supply of the power supply voltage to the first circuitry is stopped, and maintain the stop of the supply of the power supply voltage to the first circuitry until determining that the temperature detection value is less than or equal to the first threshold.

2. A method for controlling activation and deactivation of a first circuitry including a processor configured to execute a predetermined control process for controlling an operation of a control device, the method comprising:

storing, by a second circuitry, a first threshold and a second threshold larger than the first threshold as thresholds related to a temperature of the first circuitry detected by a temperature sensor, the entire temperature sensor being built in the second circuitry, activating, by the second circuitry, the first circuitry by supplying at least a power supply voltage to the first circuitry on a condition that a temperature detection value that is a value of the temperature detected by the temperature sensor is less than or equal to the first threshold, and deactivating, by the second circuitry, the first circuitry by stopping the supply of at least the power supply voltage to the first circuitry after the activating of the first circuitry on a condition that the temperature detection value is larger than the second threshold, wherein the deactivating of the first circuitry by the second circuitry includes stopping the supply of the power supply voltage to the first circuitry when determining that the temperature detection value is larger than the second threshold, continuing to monitor the temperature of the first circuitry using the temperature sensor built in the second circuitry while the supply of the power supply voltage to the first circuitry is stopped, and maintaining the stop of the supply of the power supply voltage to the first circuitry until determining that the temperature detection value does is less than or equal to the first threshold.

3. The control device according to claim 1, wherein the first circuitry is a microcontroller.

4. The control device according to claim 1, wherein the first circuitry is a System On a Chip.

5. The control device according to claim 1, wherein the first circuitry is configured to receive input information from at least one vehicle sensor, process the input information, and transmit the processed input information.

6. The control device according to claim 5, wherein the at least one vehicle sensor is a camera or a radar sensor.

7. The method according to claim 2, wherein the first circuitry is a microcontroller.

8. The method according to claim 2, wherein the first circuitry is a System On a Chip.

9. The control device according to claim 1, wherein the second circuitry is configured to generate the power supply voltage from a voltage of a battery.

10. The control device according to claim 1, wherein the power supply voltage includes a first power supply voltage for the processor of the first circuitry and a second power supply voltage for an input/output circuit of the first circuitry.

11. The control device according to claim 2, wherein the second circuitry generates the power supply voltage from a voltage of a battery.

12. The control device according to claim 2, wherein the power supply voltage includes a first power supply voltage for the processor of the first circuitry and a second power supply voltage for an input/output circuit of the first circuitry.

* * * * *